(12) United States Patent
Van Fleet

(10) Patent No.: US 8,469,220 B2
(45) Date of Patent: Jun. 25, 2013

(54) ENVELOPE HOLDER

(76) Inventor: Chastine Van Fleet, Marianna, FL (US)

( * ) Notice: Subject to any disclaimer, the term of this patent is extended or adjusted under 35 U.S.C. 154(b) by 208 days.

(21) Appl. No.: 13/017,851

(22) Filed: Jan. 31, 2011

(65) Prior Publication Data

US 2012/0193247 A1  Aug. 2, 2012

(51) Int. Cl.
*B65D 25/24* (2006.01)

(52) U.S. Cl.
USPC ........... 220/482; 177/238; 177/245; 206/215; 206/449; 206/459.5; 211/119.003; 248/213.2; 248/311.2; 248/318

(58) Field of Classification Search
USPC ............... 206/215, 449, 459.5, 557; 211/113, 211/119.003; 220/476, 480, 482; 248/213.2, 248/309.1, 311.2, 318, 339; 177/180, 238, 177/239, 240, 245
See application file for complete search history.

(56) References Cited

U.S. PATENT DOCUMENTS

| | | | | |
|---|---|---|---|---|
| 2,707,141 A * | 4/1955 | Witter | ............................. | 108/26 |
| 3,187,924 A * | 6/1965 | Marcus | .......................... | 220/480 |
| 3,477,679 A * | 11/1969 | Lovitz | ........................ | 248/213.2 |
| 5,564,566 A * | 10/1996 | Lamb | ............................. | 206/373 |
| 5,660,298 A * | 8/1997 | Thompson | ..................... | 220/482 |
| 2006/0231558 A1* | 10/2006 | Gayman | ........................ | 220/476 |
| 2007/0186515 A1* | 8/2007 | Ruetten et al. | .................. | 248/95 |
| 2007/0267551 A1* | 11/2007 | Townsend | .................. | 248/125.8 |
| 2009/0250011 A1* | 10/2009 | Biggs | ............................ | 119/246 |

\* cited by examiner

*Primary Examiner* — Luan K Bui
(74) *Attorney, Agent, or Firm* — Adrienne C. Love

(57) ABSTRACT

The envelope holder generally consists of a main body forming a pocket to accept and store the envelopes. The main body has a front on which a size indicator is affixed. A ledge is approximately perpendicular to the front of the main body such that when a card sits on the ledge the size indicator will alert the user whether or not the envelope is the correct size. A back attachment is attached to the main body such that the envelope holder can attach to the card rack.

20 Claims, 14 Drawing Sheets

ENVELOPE HOLDER

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of display racks. More specifically, the invention comprises an envelope holder that can be attached to a prior art greeting card rack.

2. Description of the Related Art

Display racks are used to display greeting cards for retail sales. An envelope is included with the sale of each greeting card. The envelopes are typically stored directly behind the cards which fit inside of its respective envelope. A prior art greeting card display rack 30 is shown in FIG. 1 and FIG. 2. Card pockets 36 are formed between rack structure 32 and lip 38. As shown, greeting cards 28 and envelopes 24 are stored in pockets 36 of prior art rack 30 such that the purchaser can easily choose the greeting card 28 that he/she wants. At the base of rack structure 32 drawers 34 or flip out shelves are utilized for storage purposes.

Oftentimes a purchaser will pick a greeting card but choose or need an envelope that is not directly behind the desired card. Additionally, a purchase may wish to purchase an individual envelope separate from a greeting card for a homemade card. The result is that the greeting cards and their corresponding envelopes are often separated creating an unorganized card display rack. Thus, the retailer must continuously sort, organize, re-stock and dispose of envelopes.

Therefore what is needed is an additional envelope holder which can store envelopes on an existing card rack separate from the greeting cards that allows a user to easily determine whether the envelope is the appropriate size for the greeting card they choose. The present invention achieves this objective, as well as others that are explained in the following description.

BRIEF SUMMARY OF THE PRESENT INVENTION

The present invention is an envelope holder for easily accessing envelopes on the front panel of an existing card display rack. The envelope holder generally consists of a main body forming a pocket to accept and store the envelopes. The main body has a front panel on which a size indicator is affixed. A ledge is approximately perpendicular to the front panel of the main body such that when a card sits on the ledge the size indicator will alert the user whether or not the card is the correct size to the properly sized pairing of a card and envelope. The retailer will decide the color selections to offer of each size envelope. A back attachment is attached to the main body such that the envelope holder can attach to the card rack.

Figure 1:
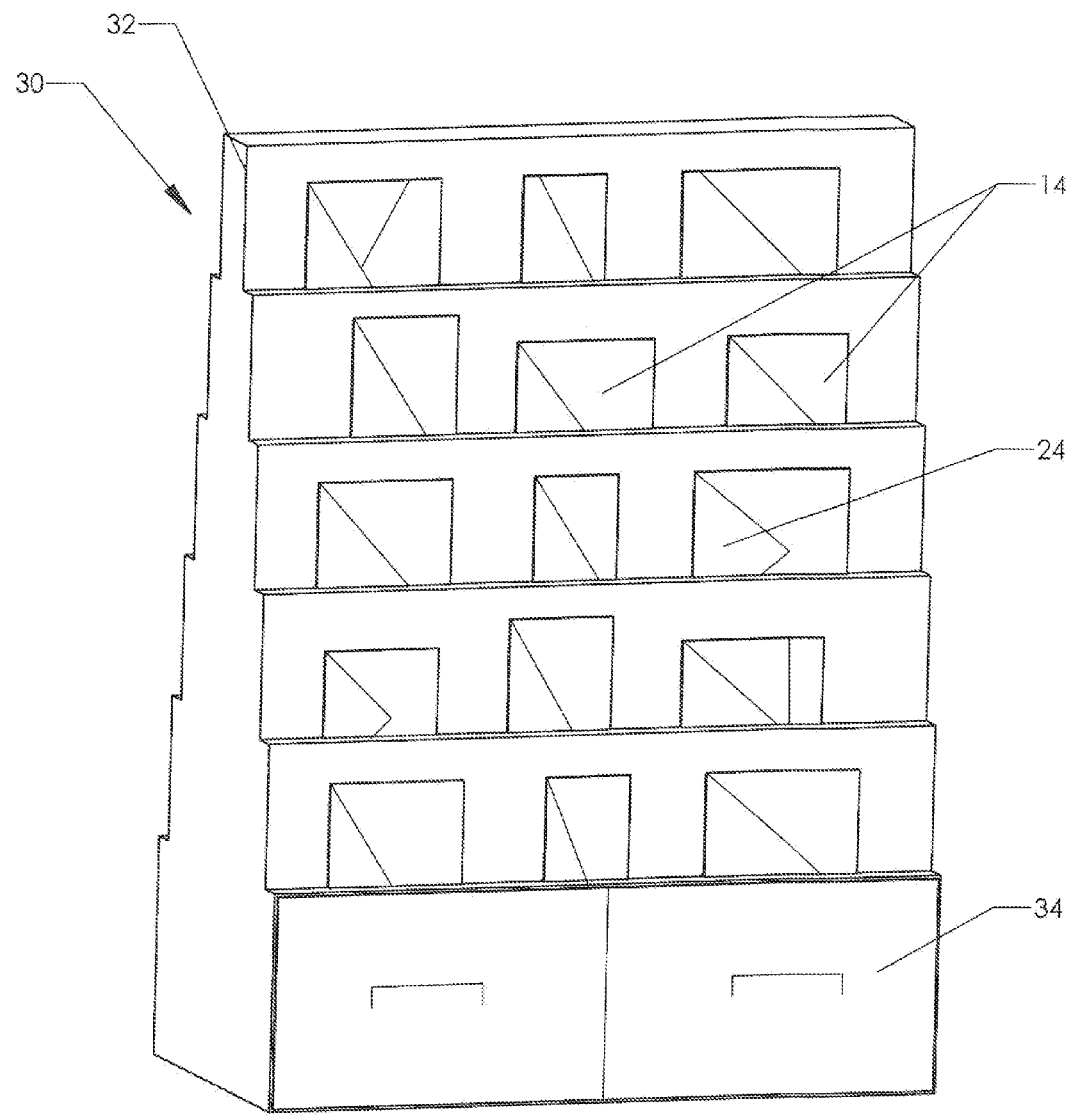
FIG. 1 is a perspective view, showing a prior art greeting card rack.
Figure 2:
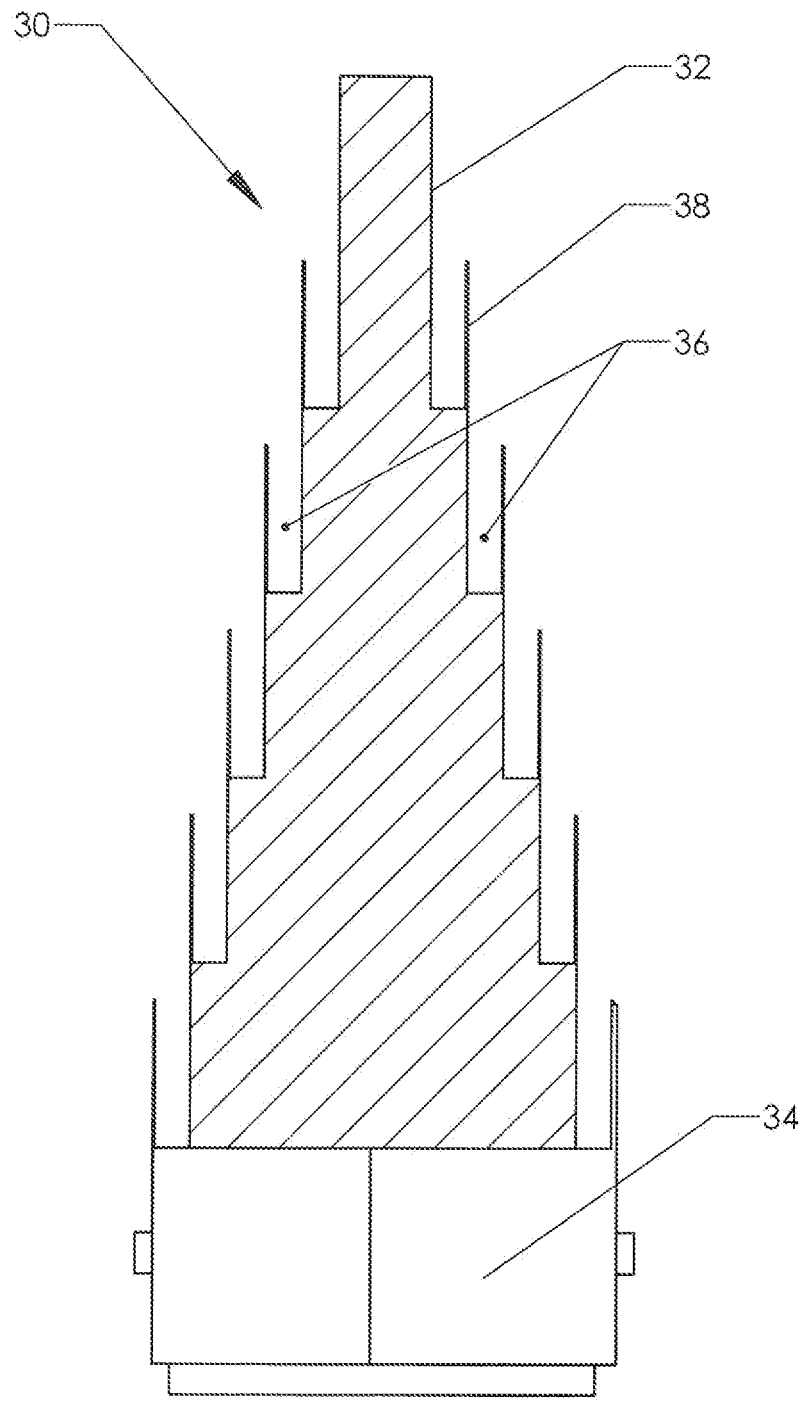
FIG. 2 is a section view, showing a prior art greeting card rack.

| REFERENCE NUMERALS IN THE DRAWINGS | | | |
|---|---|---|---|
| 10 | envelope holder | 12 | main body |
| 14 | card | 16 | pocket |
| 18 | front panel | 20 | ledge |
| 22 | back attachment | 24 | envelopes |
| 26 | size indicator | 28 | cut away |
| 30 | prior art card rack | 32 | rack structure |
| 34 | drawer | 36 | pockets |
| 38 | lip | 40 | panel |
| 42 | weight indicator | 44 | grips |
| 46 | tongue | 48 | groove |
| 50 | compressible material | 52 | device |
| 54 | base | 56 | front member |
| 58 | channel | | |

DETAILED DESCRIPTION OF THE INVENTION

Figure 3:
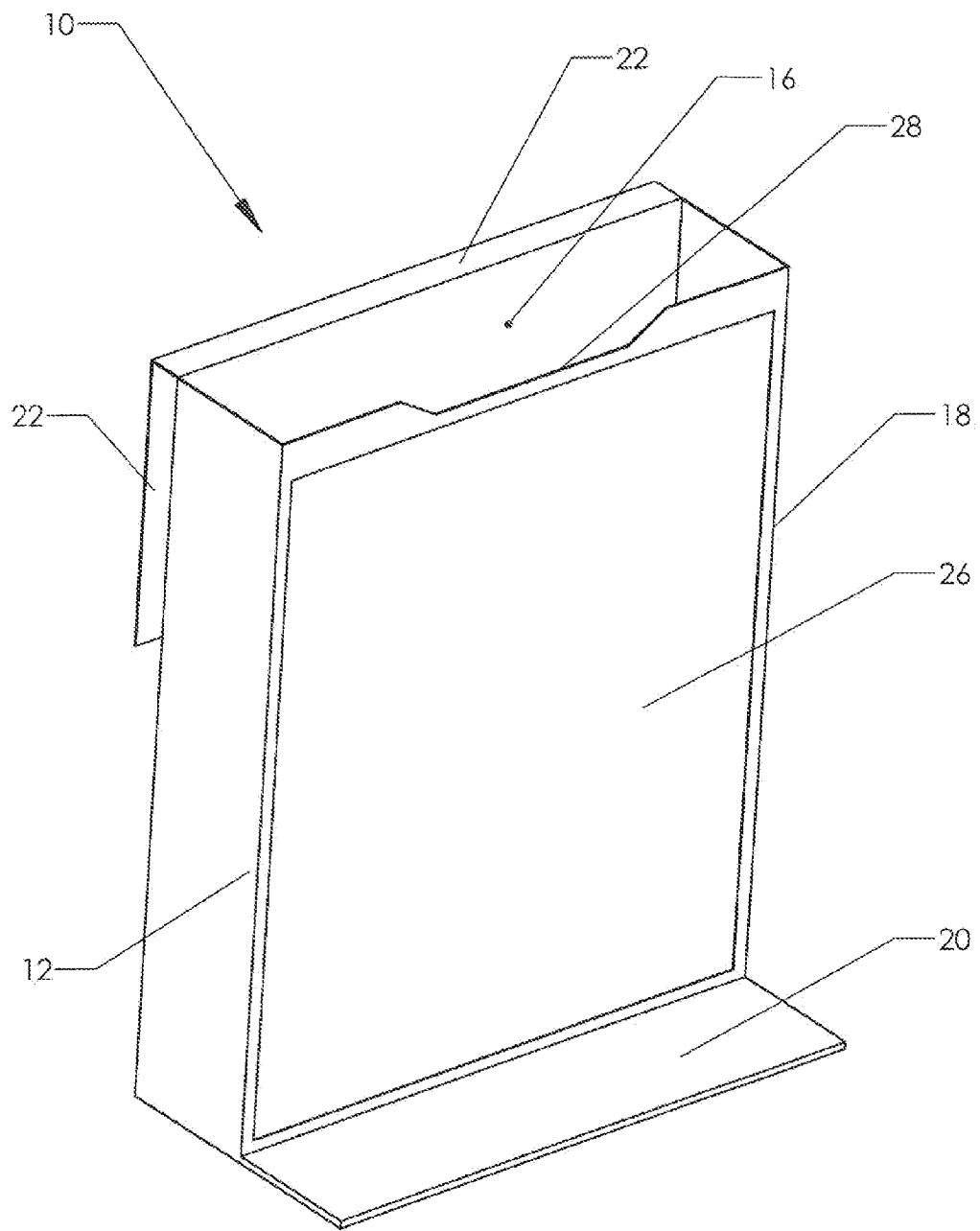
FIG. 3 is a perspective view, showing the present envelope holder.
Figure 11:
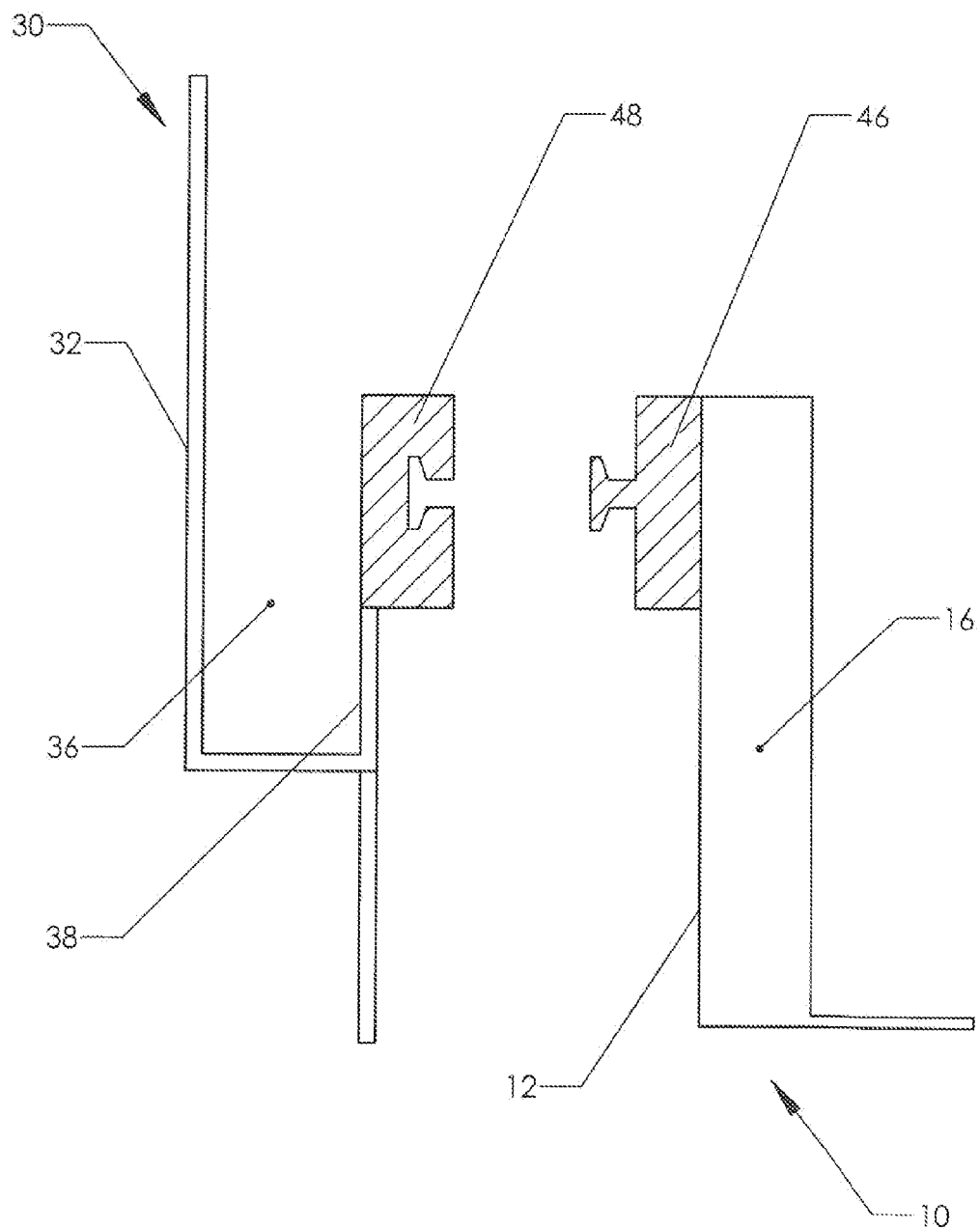
FIG. 11 is a section view, showing an alternate embodiment of the back attachment of the present invention.

FIG. 3 illustrates envelope holder 10 in the preferred embodiment. Envelope holder 10 is generally comprised of back attachment 22, main body 12 which forms pocket 16, ledge 20 and size indicator 26 located on front panel 18. Additionally, front panel 18 preferably contains a cut away 28 which allows user to easily access items in pocket 16. Back attachment 22 is preferably a hook which is integrated with and extends from the top of main body 12. However, as shown in FIG. 11, back attachment 22 is not limited to this embodiment.

Figure 4:
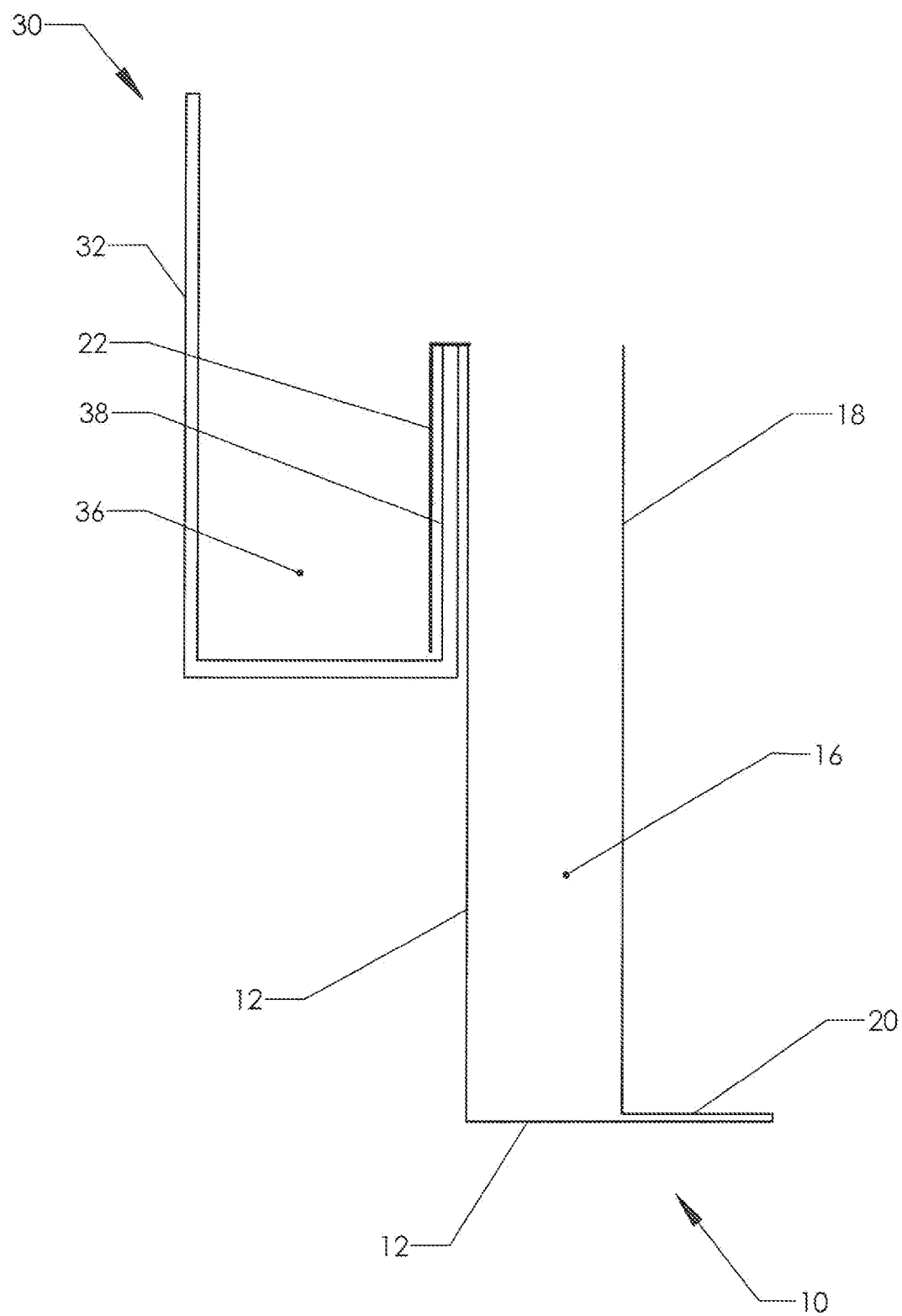
FIG. 4 is a section view, showing the present envelope holder attached to a prior art greeting card rack.

As illustrated in a section view in FIG. 4, envelope holder 10 attaches to prior art greeting card rack 30. Back attachment 22 fits over existing lip 38 of rack structure 32. Back attachment 22 preferably sits close to inside wall of lip 38 such that envelope holder 10 is held firmly in place on greeting card rack 30. Envelope holder 10 can be attached to prior art rack structure 30 and still allow space for greeting cards to fit into prior art pockets 36. As will be described further, the present envelope holder 10 allows the retailer to stock greeting cards in pockets 36 of rack structure 32 independent from their respective envelopes. It is in this manner that the retailer is not required to spend time organizing and re-stocking envelopes behind each greeting card.

Figure 5:
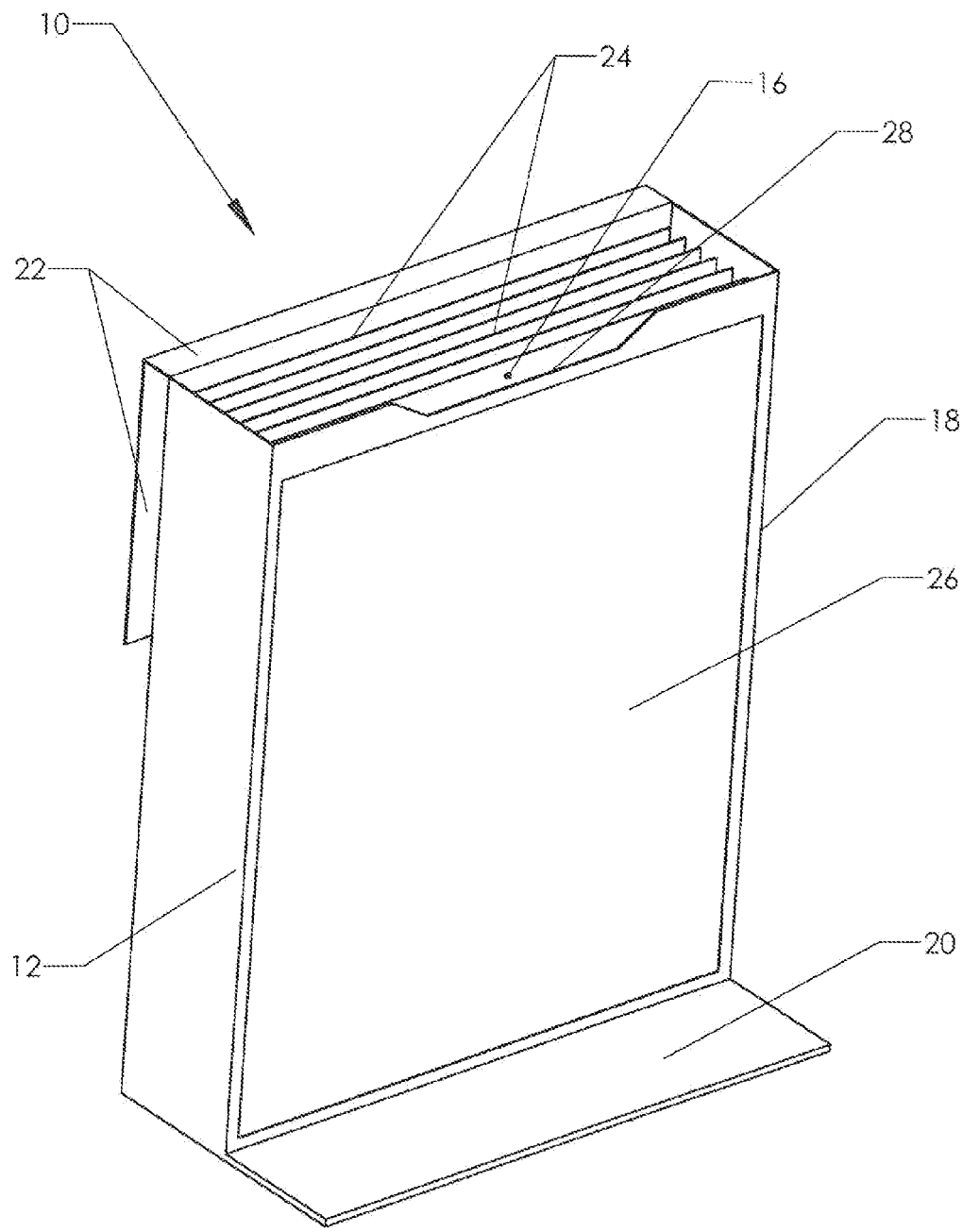
FIG. 5 is a perspective view, showing the present envelope holder with envelopes.
Figure 6:
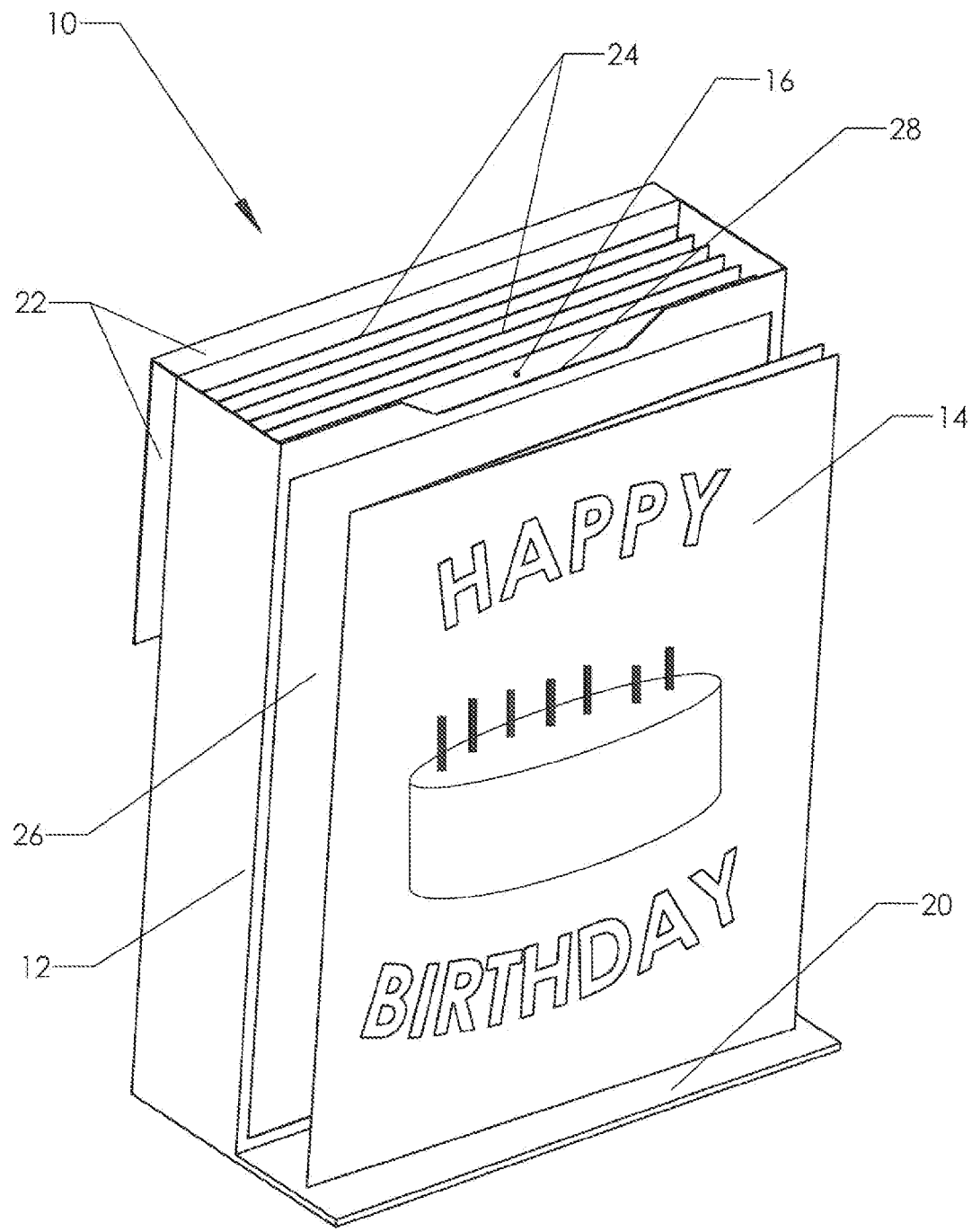
FIG. 6 is a perspective view, showing the present envelope holder with a greeting card on the ledge.
Figure 7:
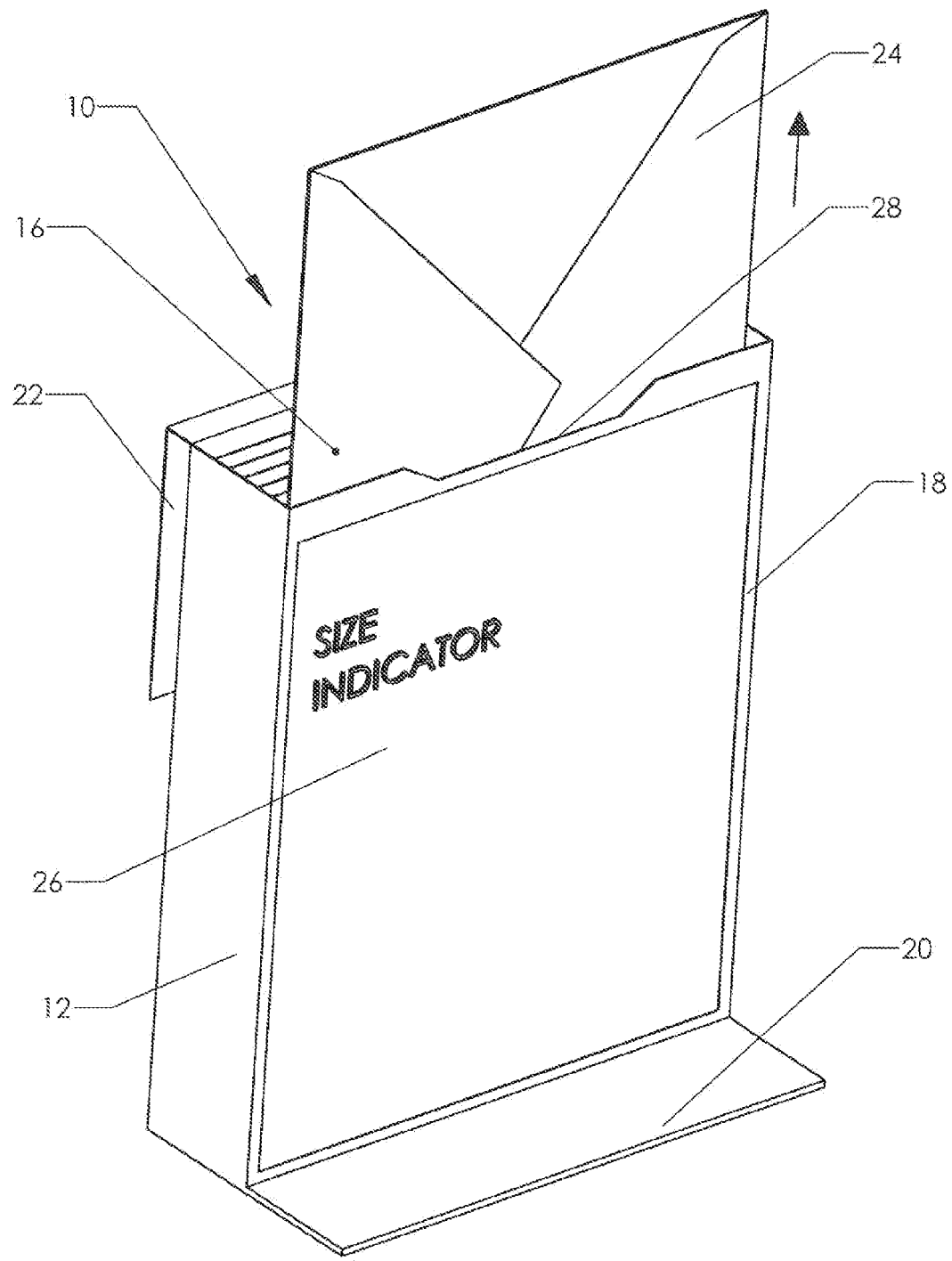
FIG. 7 is a perspective view, showing the present envelope holder as an envelope is pulled out of the pocket.

FIG. 5 shows envelope holder 10 holding envelopes 24 in pocket 16. Main body 12, back attachment 22 and ledge 20 are preferably fully integrated into one unit. However, as described below, an alternative embodiment is described and shown in FIGS. 13A and 13B in which ledge is not directly attached to front panel 18, but merely perpendicular to front panel 18 as is claimed. Size indicator 26 is located on the front panel 18 of main body 12. As shown in FIG. 6, once a user picks a card 14, the user places card 14 on ledge 20 to determine the correct envelope 24 to purchase. If card 14 lines up with size indicator 26, the user takes envelope 24 from envelope holder 10. As illustrated in FIG. 7, cut away 28 allows a user to easily grasp and pull an envelope 24 from pocket 16. Size indicator 26 is shown on the front panel 18 of main body 12. While size indicator 26 is primarily used for the purpose of providing the user with an easy and efficient way of determine which envelope holder 10 to take an envelope 24 from, size indicator 26 could also contain advertising materials and/or extra postage indicators if envelope 24 is of a shape which automatically requires additional postage.

Figure 8:
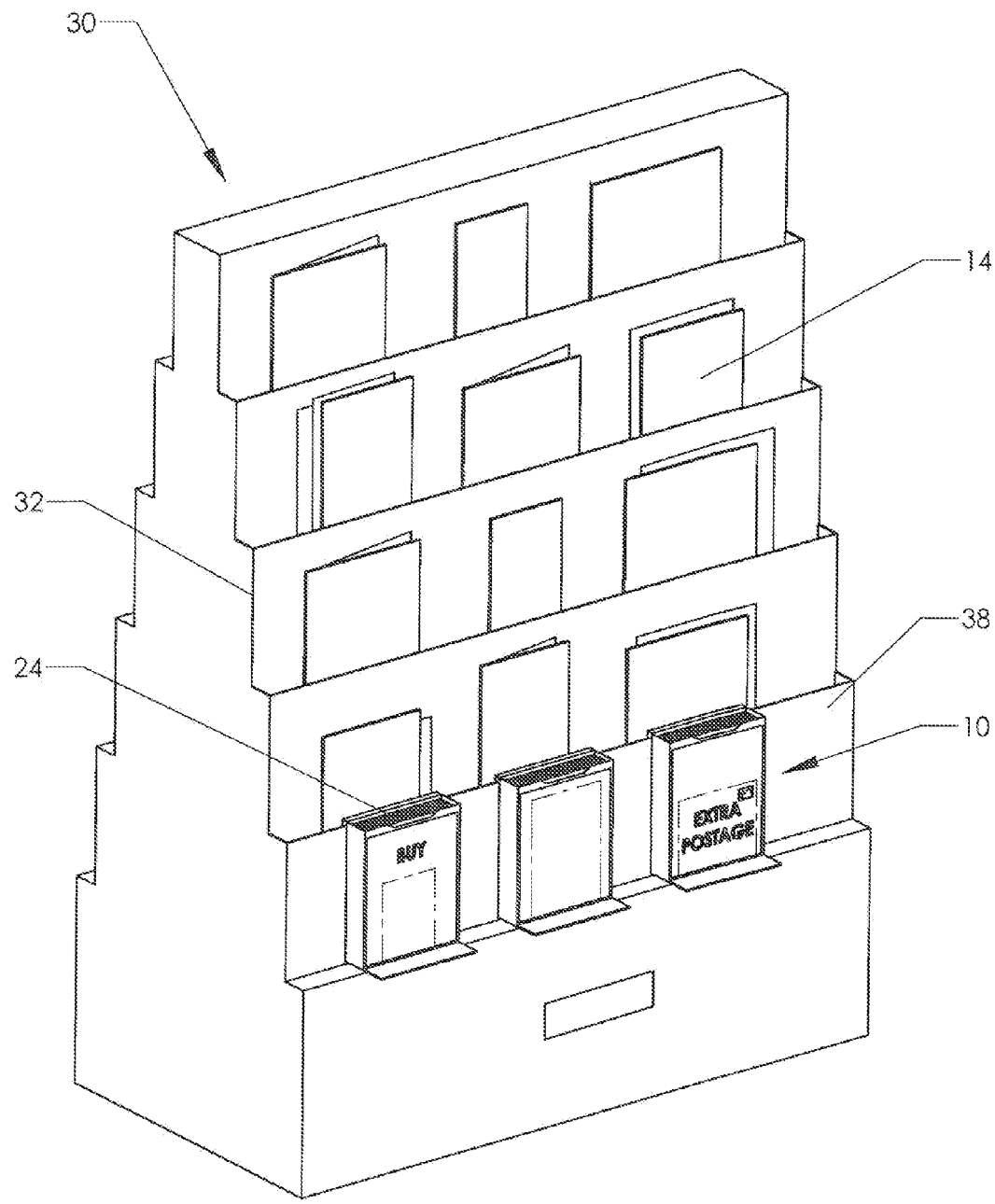
FIG. 8 is a perspective view, showing the present envelope holder attached to a prior art greeting card rack.

FIG. 8 shows present envelope holders 10 attached to a prior art card rack 30. Envelope holders 10 can be attached on any level of prior art card rack 30. A retailer could maintain the normal routing of merchandising the cards in the pockets with the free envelopes that are initially shipped with them. Once the envelope holders 10 are in place and in service, they would be used to store the appropriate sized unmatched envelopes that would normally be disposed of. The retailer could have any number of envelope holders 10 that corresponded to each particularly sized envelope 24 needed or desired. It is in this manner that a retailer can eliminate having to organize and dispose of un-paired envelopes at the end of the each day. A retailer may also want to use the envelope holders 10 for all envelope needs giving extra space for card inventory. In any case, the retailer would only need to re-stock envelopes 24 in each individual envelope holder 10.

Additionally, while in the present embodiment envelope holders 10 are shown attached to a particular prior art card rack 30, any rack or display device could be used to attach envelope holder 10 to.

Figure 9:
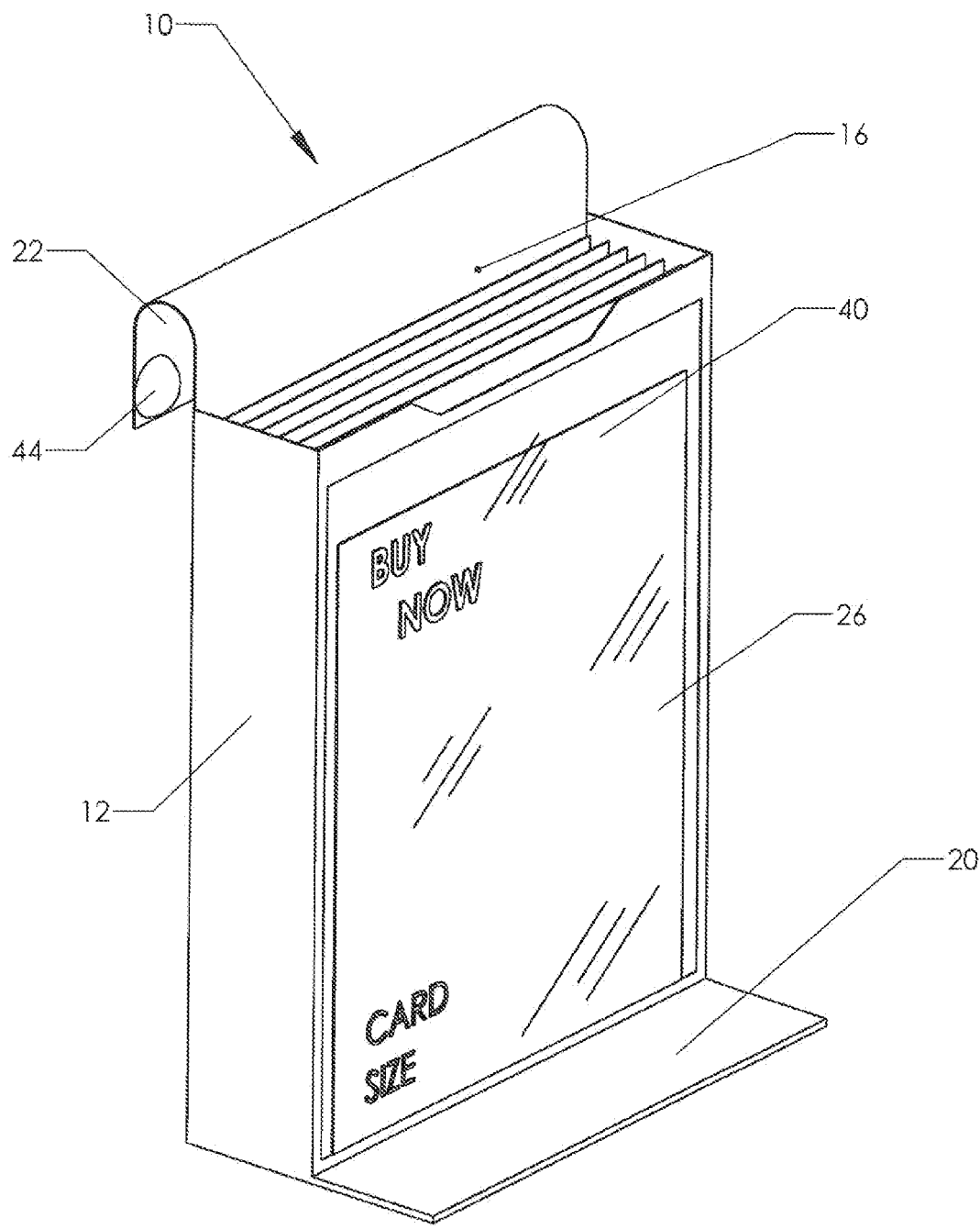
FIG. 9 is a perspective view, showing an alternate embodiment of the present invention.

An alternate embodiment of the present invention is shown in FIG. 9. In the alternate embodiment back attachment 22 is curved rather than square and contains grips 44 to assist in a stable connection to prior art rack. Additionally, front panel 18 contains panel 40, a clear pocket which can hold size indicator 26. Size indicator 26 could be any paper or cardboard piece that could be inserted into panel 40. This would enable the same envelope holder 10 to be utilized for different sized envelopes and cards, as the size indicator could be changed out easily. Additionally, size indicator 26 could contain advertisements that could be rotated along with the sheet used for size indicator 26.

Figure 10:
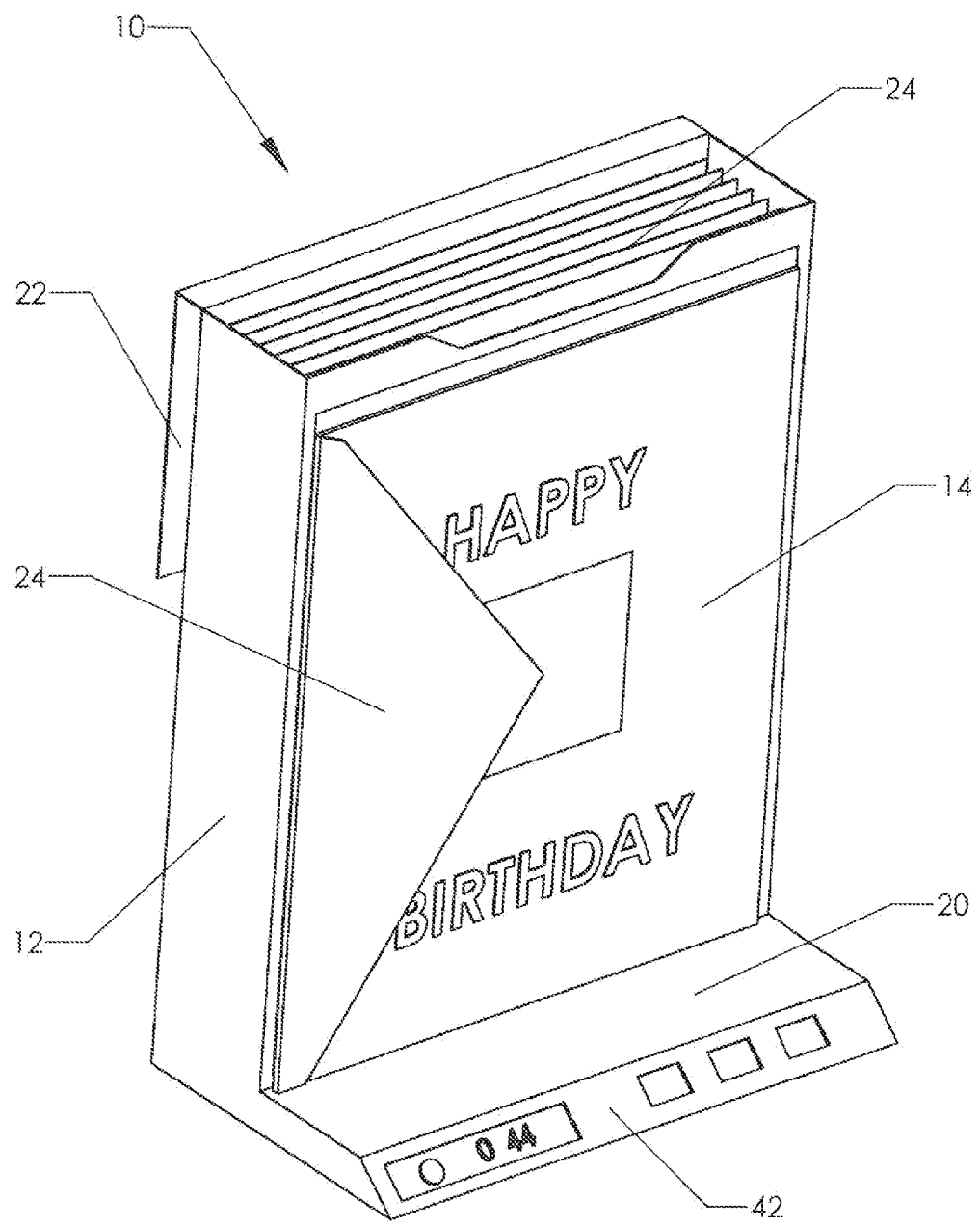
FIG. 10 is a perspective view, showing an alternate embodiment of the present invention with a card scale as a ledge.

FIG. 10 shows an embodiment of the present invention wherein ledge 20 is further comprised of a weight indicator 42 such as a scale. Weight indicator 42 weighs card and envelope 24 once the user picks out the desired card and envelope. If the card and envelope weigh more than the amount of one stamp the scale will indicate this and alert the user that additional postage will be necessary to mail the card. The manner in which the weight indicator 42 alerts the user could be by any known method of attracting the user's attention, including a sound, buzz, light or simply a display screen as shown. Additionally, any manner of weighing the card and envelope that is known in the prior art can be utilized in place of the disclosed scale to accomplish alerting the user that additional postage is necessary. For example, FIGS. 13A and 13B illustrate another embodiment of the present invention.

Another alternate embodiment of the present invention is shown in FIG. 11, wherein back attachment is a tongue and groove attachment method. As shown, tongue 46 is attached to main body 12 of present envelope holder 10. Groove 48 is attached to lip 38 of prior art greeting rack 30. Tongue 46 slides into groove 48 stabilizing envelope holder 10 against card rack 30.

Figure 12:
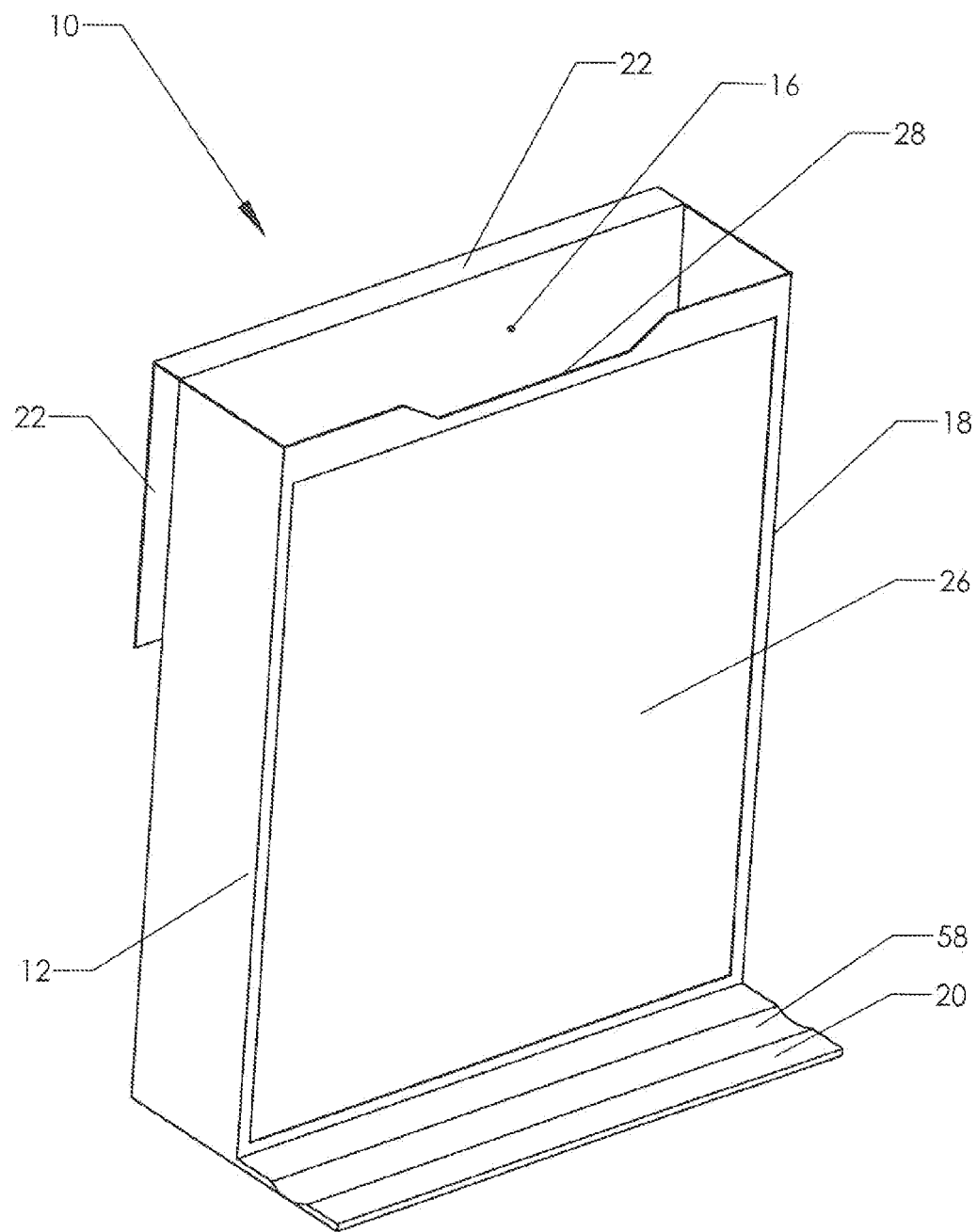
FIG. 12 is a perspective view, showing an alternate embodiment of the present invention.

FIG. 12 illustrates an optional channel 58 located on ledge 20 to assist user in setting card on ledge 20. While channel 58 is shown located in the center of ledge 20 for illustration purposes, channel 58 could be located anywhere on ledge 20, particularly it may be desirable that ledge 20 is closer to front panel 18.

Figure 13A:
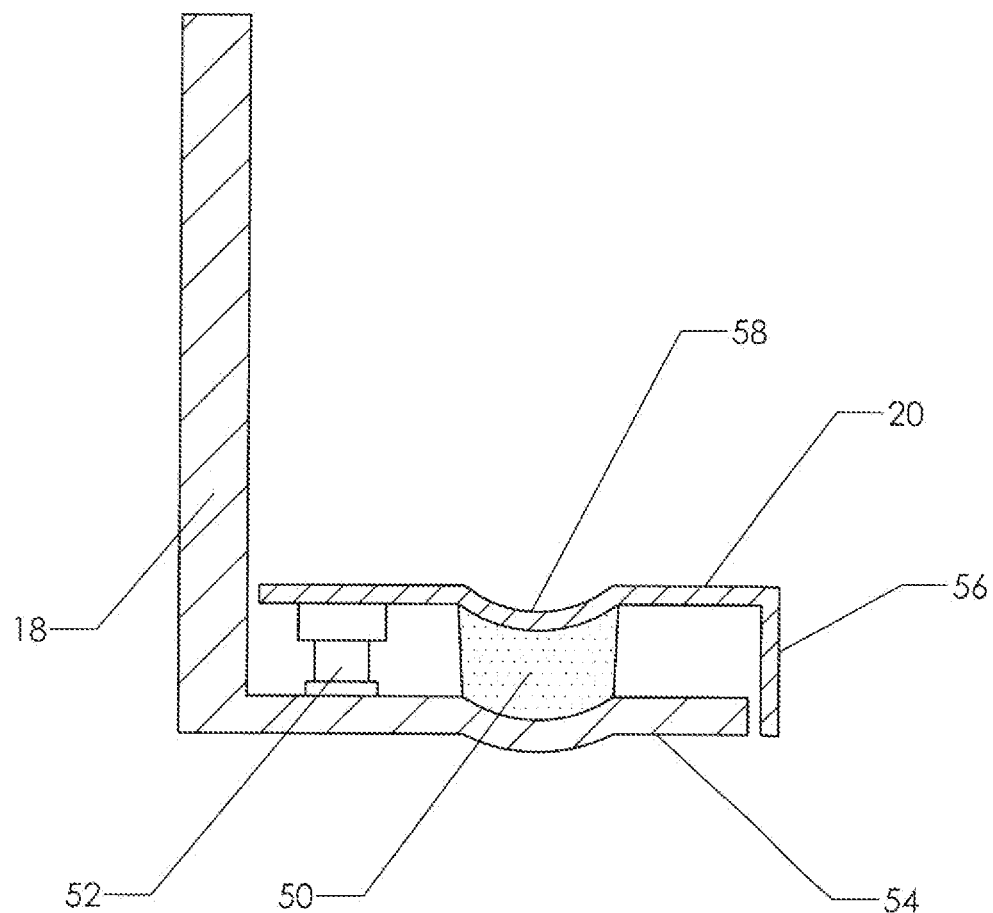
FIG. 13A is a section view, showing an optional embodiment of the scale section of the ledge in the present invention.
Figure 13B:
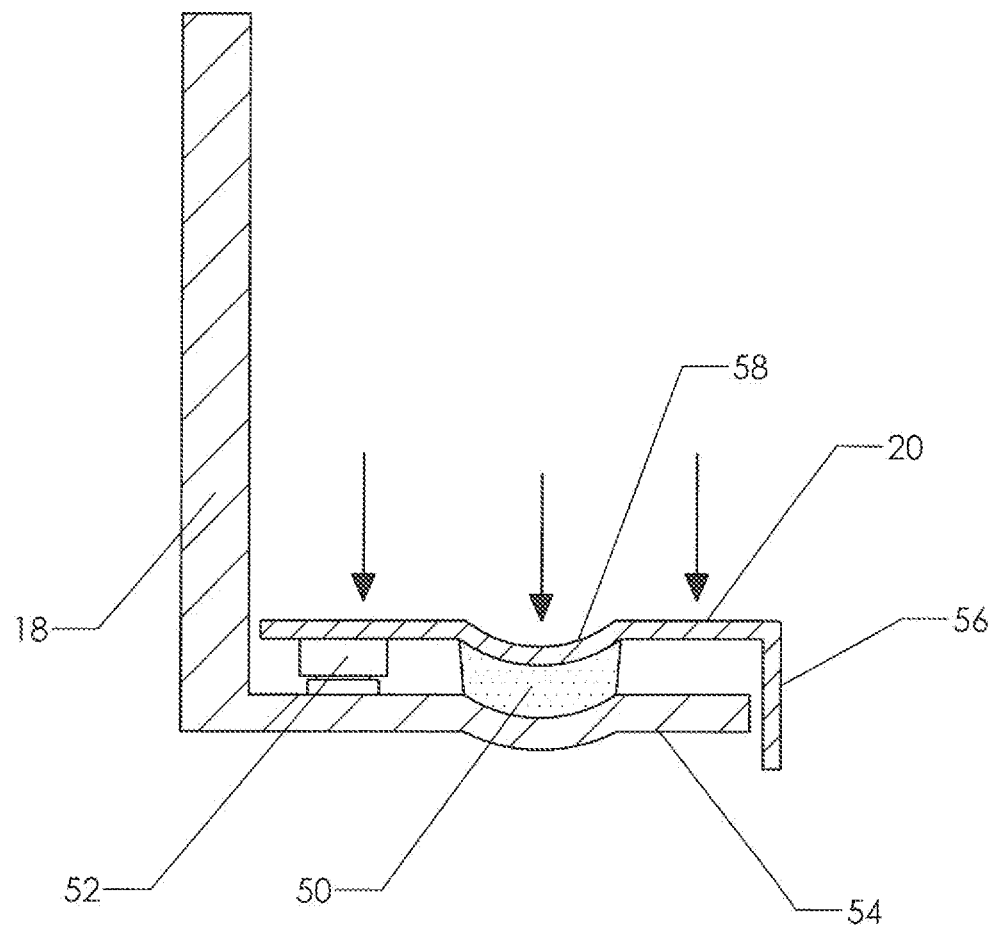
FIG. 13B is a section view, showing an optional embodiment of the scale section of the ledge in the present invention wherein the ledge is depressed.

FIGS. 13A and 13B show an optional scale embodiment for the present invention. The optional scale embodiment consists of base 54, ledge 20, channel 58, front member 56, device 52, and compressible material 50. FIGS. 13A and B show front panel 18 attached directly to base 54 which extends outward from front panel 18. Ledge 20 and channel 58 are primarily attached to base 54 by way of compressible material 50. While compressible material 50 is shown as a foam type material, a spring or other material could be used in its place which would achieve the same result.

Device 52 is attached to base 54 and to ledge 20. Device 52 can be any device which elicits sound or light (or other perceivable indicia) upon compression. The reader will appreciate that while the internal components of device 52 are not shown, device 52 should contain a means for the completion of an electrical circuit, a small battery and optionally a speaker or light. It is known in the art that an electronic circuit can be completed by compressing device 52. For example, the compression can cause two wires or metal connectors, within device 52, to meet thereby completing an electrical circuit and causing a sound or light to occur. Device 52 can cause light or sound to occur at any place on or around the present envelope holder 10. For example, a wire can extend out of device 52 to LED lights located around front panel 18 or, in the alternative; a wire can extend to a speaker located on front panel 18, main body 12 and/or back attachment 22 (see FIG. 12 for component parts of envelope holder 10). For purposes of the present invention activation of device 52 should be understood to mean the activation of a sound or light or other indicia to be perceived by the user.

Compressible material 50 is designed to accept a particular amount of weight. With no weight on ledge 20 (or channel 58) compressible material 50 holds device 52 in a non-active position (see FIG. 13A). When additional weight is added to ledge 20 (or channel 58) compressible material 50 is compressed. Compression is shown in FIG. 13B, by the arrows pointing downward on ledge 20. It is preferable that sound or light is activated when the weight differential between the weight of the ledge 20 (and channel 58) and the weight of ledge 20 (and channel 58) plus the card and envelope is any weight greater than 3.50 ounces. The reader will appreciate that a card and envelope weighing greater than 3.50 ounces would require additional postage. For purposes of clarity, the component pieces of optional scale embodiment are shown larger than is necessary. Thus, the gaps between ledge 20 and front panel 18 and front member 56 and base 54 can be minimal and device 52 and compressible material 50 can be smaller if desired. Additionally, while device 52 is shown located between compressible material 50 and front panel 18, device 52 could, in the alternative, be located between compressible material 50 and front member 56 and channel 58 could be positioned very close to front panel 18 on ledge 20.

The preceding description contains significant detail regarding the novel aspects of the present invention. It should not be construed, however, as limiting the scope of the invention but rather as providing illustrations of the preferred embodiments of the invention. As an example, back attachment 22 could be any means which allows main body 12 to attach to prior art greeting card rack 30. Additionally, weight indicator 42 could be included in ledge 20. Thus, the scope of the invention should be fixed by the following claims, rather than by the examples given.

Having described my invention, I claim:

1. An envelope holder for attachment to a rack for greeting cards, such that a user can easily access at least one envelope set inside said envelope holder, said holder comprising:
   a. a main body forming a pocket configured to accept said at least one envelope having an area,
      wherein said main body has a front panel;
   b. a size indicator attached to said front panel having an outline of an area corresponding to said area said at least one envelope within said envelope holder;
   c. a ledge extending approximately perpendicular from said front panel of said main body such that when a greeting card is set on said ledge said size indicator indicates to said user that said at least one envelope in said envelope holder is the correct size when said greeting card fits within said outline of said area on said size indicator; and
   d. a back attachment attached to said main body configured to attach said envelope holder to said rack.

2. The holder of claim 1, wherein said main body has a cut-away around said pocket.

3. The holder of claim 1, wherein said back attachment is a hook configured to attach to said rack.

4. The holder of claim 1, wherein said back attachment is a tongue configured to attach to said rack.

5. The holder of claim 1, wherein said ledge is attached directly to said front panel.

6. The holder of claim 1, further comprising a weight indicator attached to said ledge.

7. The holder of claim 6, wherein said weight indicator is a scale with a digital display.

8. The holder of claim 7, wherein said weight indicator is a scale wherein when said scale weighs more than a particular weight a light blinks on said ledge.

9. The holder of claim 7, wherein said weight indicator is a scale wherein when said scale weighs more than a particular weight a sound is played.

10. The holder of claim 6, wherein said weight indicator further comprises:
    a. a base attached to said front panel, wherein said base extends approximately perpendicular from said front panel;
    b. wherein said ledge is attached to said base of said front panel by a compressible material;
    c. a device positioned between said base and said ledge such that there is a distance between said base and said ledge; and
    d. wherein said device is activated by said distance between said base and said ledge decreasing.

11. The holder of claim 10, wherein said compressible material is comprised of foam.

12. The holder of claim 10, wherein said compressible material is at least one spring.

13. An envelope holder for attachment to a rack for greeting cards wherein said rack has a plurality of pockets defined by a lip, such that a user can easily access envelopes separate from said greeting cards, said holder comprising:
    a. a main body forming a pocket configured to accept an envelope having an area,
       wherein said main body has a front panel;
    b. a size indicator having an area attached to said front panel, wherein said area of said size indicator directly corresponds to said area of said envelope;
    c. a ledge located approximately perpendicular to said front panel of said main body;
       i. wherein said size indicator is located proximate said ledge; and
    d. a back attachment attached to said main body such that said back attachment removably attaches to said lip of said rack.

14. The holder of claim 13, wherein said main body has a cut-away proximate said pocket configured to allow said user to easily grasp said envelope.

15. The holder of claim 13, wherein said back attachment further comprises a plurality of grips.

16. The holder of claim 13, further comprising a weight indicator attached to said ledge.

17. The holder of claim 16, wherein said weight indicator further comprises:
    a. a base attached to said front panel, wherein said base extends approximately perpendicular from said front panel;
    b. wherein said ledge is attached to said base of said front panel by a compressible material;
    c. a device positioned between said base and said ledge such that there is a distance between said base and said ledge; and
    wherein said device is activated by said distance between said base and said ledge decreasing.

18. The holder of claim 17, wherein said compressible material is comprised of foam.

19. The holder of claim 17, wherein said compressible material is at least one spring.

20. An envelope holder for attachment to a rack for greeting cards wherein said rack has a plurality of pockets defined by a lip, wherein said lip has a groove, such that a user can easily access envelopes separate from said greeting cards, wherein each of said greeting cards have an area and each of said envelopes have an area, said holder comprising:
    a. a main body forming a pocket having a top opening configured to accept said envelopes;
       i. wherein said main body has a front panel;
       ii. wherein a size indicator is attached to said front panel having an outline of said area of said envelope contained in said envelope holder
    b. a ledge extending approximately perpendicular to said front of said main body;
       i. wherein said size indicator is located proximate said ledge such that a selected card having an area, can sit on said ledge to use said size indicator by allowing said user to compare sat area of said selected card to said area of said envelope within said envelope holder defined by said size indicator; and c. a back attachment having a tongue attached to said main body such that said tongue removably attaches to said groove of said lip of said rack.

\* \* \* \* \*